United States Patent [19]

Atkins et al.

[11] Patent Number: 5,235,659
[45] Date of Patent: Aug. 10, 1993

[54] METHOD OF MAKING AN ARTICLE COMPRISING AN OPTICAL WAVEGUIDE

[75] Inventors: Robert M. Atkins, Millington; Paul J. Lemaire, Madison; Victor Mizrahi, Bedminster; Kenneth L. Walker, New Providence, all of N.J.

[73] Assignee: AT&T Bell Laboratories, Murray Hill, N.J.

[21] Appl. No.: 878,802

[22] Filed: May 5, 1992

[51] Int. Cl.$^5$ .............................................. G02B 6/18
[52] U.S. Cl. .................................... 385/124; 385/141; 65/3.11
[58] Field of Search .............................. 385/123–126, 385/141–145; 65/3.11

[56] References Cited

U.S. PATENT DOCUMENTS

| | | | |
|---|---|---|---|
| 4,441,788 | 4/1984 | Guerder et al. | 385/124 X |
| 4,460,241 | 7/1984 | Cohen | 385/124 X |
| 4,715,679 | 12/1987 | Bhagavatula | 385/124 X |
| 4,715,695 | 12/1987 | Nishimura | 385/124 X |
| 4,725,110 | 2/1988 | Glenn et al. | 350/3.61 |
| 4,807,950 | 2/1989 | Glenn et al. | 350/3.61 |
| 5,048,923 | 9/1991 | Tsumanuma et al. | 385/124 X |
| 5,123,076 | 6/1992 | Nishimoto et al. | 385/124 |

OTHER PUBLICATIONS

"Shifts in Resonance Wavelengths of Bragg Gratings During Writing or Bleaching Experiments by UV Illumination Within Germanosilicate Optical Fibre", by E. Fertein et al., *Electronics Letters*, vol. 27, No. 20, Sep. 26, 1991, pp. 1838–1839.

"Permanent Photoinduced Birefringence in a Ge-doped Fiber", by F. Ouellette et al., Applied Physics Letters, vol. 58(17), Apr. 29, 1991, pp. 1813–1815.

"Bragg Grating Formation and Germanosilicate Fiber Photosensitivity", by G. Meltz et al., SPIE, vol. 1516, International Workshop on Photoinduced Self-Organization in Optical Fiber, May 10–11, 1991, Quebec City, Canada, Paper 1516-18.

"Photosensitive Changes in Ge-Doped Fibres, Observed by Raman Spectroscopy", by D. McStay, SPIE, vol. 1314, Fibre Optics '90, pp. 223–233.

*Primary Examiner*—Akm E. Ullah
*Attorney, Agent, or Firm*—E. E. Pacher

[57] ABSTRACT

Unexpectedly large normalized refractive index changes ($\Delta > 10^{-5}$, but possibly even larger than $10^{-3}$) can be obtained in $SiO_2$-based optical waveguides (fiber or planar waveguides) by a treatment that comprises exposing at least a portion of the waveguide at a temperature of at most 250° C. to $H_2$ (partial pressure greater than 1 atmosphere), and irradiating at least a part of the exposed portion with actinic (typically UV) radiation.

14 Claims, 2 Drawing Sheets

METHOD OF MAKING AN ARTICLE COMPRISING AN OPTICAL WAVEGUIDE

FIELD OF THE INVENTION

This invention pertains to a method of making an article that comprises an optical waveguide, exemplarily optical fiber. More particularly, it pertains to a method that comprises locally changing a refractive index of the waveguide.

BACKGROUND OF THE INVENTION

In-line optical fiber refractive index gratings are known. See, for instance, U.S. Pat. No. 4,807,950, incorporated herein by reference. See also U.S. Pat. No. 4,725,110, which claims a method of producing such a grating. The currently preferred method of "writing" an in-line grating into optical fiber comprises interference between two beams of actinic (typically UV) radiation in a portion of the fiber. The two beams are incident on the fiber in a transverse direction, the angle between the two beams (and the wavelength of the radiation) defining the grating spacing.

Typically fiber gratings are formed in Ge-doped fiber. See, for instance, F. Ouellette et al., *Applied Physics Letters*, Vol. 58(17), p. 1813, which inter alia discloses that the sensitivity of the Ge-doped fiber to actinic radiation can be enhanced by a thermal hydrogen treatment (4 hours at 400° C. in 12 atm of $H_2$). See also G. Meltz et al., SPIE, Volume 1516, International Workshop on Photoinduced Self-Organization in Optical Fiber, May 10–11, 1991, Quebec City, Canada, paper 1516–18, which reports treating a heavily doped germanosilicate preform rod for 75 hours at 610° C. in 1 atm. $H_2$ to enhance the photosensitivity of the glass. U.S. patent application Ser. No. 643,886, filed Jan. 18, 1991 for R. M. Atkins et al., now U.S. Pat. No. 5,157,747, discloses a process of manufacturing optical fiber that enhances the GeO/$GeO_2$ ratio in the Ge-doped core of the fiber, thereby enhancing the sensitivity of the fiber to actinic radiation. The process involves, exemplarily, collapsing the preform tube in a substantially oxygen-free atmosphere.

The prior art $H_2$ sensitization treatments involve exposure of the glass to $H_2$ at a relatively high temperature, typically at least 400° C. This high temperature treatment would at best be inconvenient if applied to optical fiber. As is well known, optical fiber typically is coated with a polymer material as part of the draw process, since uncoated fiber is fragile and rapidly loses its strength, especially if handled. At the temperatures of the prior art $H_2$ treatments, typical polymer fiber coatings would be destroyed or at least severely damaged. Furthermore, the prior art high temperature sensitization treatment frequently increases the optical loss in the fiber and/or may weaken the fiber.

D. McStay, SPIE, Vol. 1314, "Fibre Optics '90", pp. 223–233, inter alia reports exposing Ge-doped optical fiber to $H_2$ for various times at various temperatures and pressures, exemplarily 3 days at 24° C. and 1 atmosphere. Raman measurements were interpreted to reveal the presence of molecular hydrogen in the fiber after the exemplary treatment. Exposure of the fiber to 488 nm radiation resulted in increase of a Raman peak at about 2150 $cm^{-1}$. The peak appeared even if irradiation was delayed until after essentially all of the $H_2$ had again been lost from the fiber. The author disclosed that the observed photosensitive reaction was a weak one, and suggested that a two-photon process may be involved. No refractive index change was observed.

In view of the potential advantages offered by in-line refractive index gratings in optical waveguides, it would be highly desirable to have available a method of locally increasing a waveguide refractive index that is free of the above discussed shortcomings of the prior art. Furthermore, it would be very desirable if strong in-line gratings could be written into optical fiber of the type conventionally manufactured and installed for optical fiber communication systems. This application discloses a method that has these and other advantageous features.

GLOSSARY

An "optical waveguide" herein is an elongate structure that comprises a "core" of relatively high refractive index glass that is at least partially surrounded by a "cladding" of relatively low refractive index glass, and that is adapted for transmitting therethrough in the longitudinal direction electromagnetic radiation of "optical" wavelength, exemplarily 0.4–1.7 $\mu$m.

SUMMARY OF THE INVENTION

We have introduced relatively large quantities of molecular hydrogen ($H_2$) into high-silica glass (exemplarily more than 80 mole percent $SiO_2$) at quite low temperatures (at most 250° C., but preferably below 150° or even 100° C.) and moderate pressures ($H_2$ partial pressure greater than 1 atmosphere, preferably greater than 10 atmospheres), and have made the quite unexpected discovery that irradiation of the $H_2$-containing glass with actinic radiation (typically UV) can increase the refractive index of the glass in the irradiated region by an unprecedentedly large amount. Exemplarily the normalized index changes ($\Delta = \Delta n/n$) are at least $10^{-5}$, but preferably are at least $5 \times 10^{-5}$ or $10^{-4}$, and can be even larger than $10^{-3}$. The changes can persist substantially indefinitely if the glass is not heated, with at least a significant fraction of the change surviving moderate heating (e.g., $\leq 400°$ C.) of the glass. Index changes of less than $10^{-5}$ can of course be produced but are typically not commercially useful.

The invention relates to a method of making an article that comprises an optical waveguide, (e.g., an optical fiber, or a planar waveguide), and comprises providing the waveguide, exposing the waveguide to $H_2$ and irradiating at least a portion of the waveguide with actinic radiation such that the refractive index of the irradiated portion is changed. Significantly, during the $H_2$-exposure step the waveguide is at a temperature of at most 250° C. The waveguide is exposed to a $H_2$-containing atmosphere that has a $H_2$ partial pressure of at least 1 atmosphere, and the resulting normalized index change is at least about $10^{-5}$, and preferably is at least $5 \times 10^{-5}$ or $10^{-4}$. By "hydrogen" or "$H_2$" we mean herein hydrogen and its isotope deuterium.

The inventive method can be used in a variety of ways. For instance, it can be used to make in-line refractive index gratings in optical fiber or in planar waveguides, or it can be used to produce a substantially uniform index change in a portion of an optical fiber or planar waveguide. It can even be used to "write" the core of a planar optical waveguide into a layer of appropriately doped high-silica glass.

DETAILED DESCRIPTION OF SOME PREFERRED EMBODIMENTS

Exemplary of the novel hydrogen treatment is the following. Three samples of standard, commercially available, optical communications fiber (namely, AT&T's 5D fiber which has a germanosilicate core, with about 2.6 mole % $GeO_2$, and which, absent a sensitization treatment, exhibits no significant photosensitivity; exemplarily $\Delta \lesssim 10^{-5}$) were maintained at 75° C. for periods of 48–72 hours in a hydrogen atmosphere at 10.4, 42 and 147 atmospheres. The resulting $H_2$-concentrations in the fiber core were calculated to be, respectively, $6.98 \times 10^2$, $2.82 \times 10^3$, and $9.84 \times 10^3$ parts per million (ppm; 1 ppm is defined as $10^{-6}$ moles $H_2$ per mole of $SiO_2$). Exposure of the thus prepared fibers to UV radiation (about 242 nm) from an excimer pumped, frequency doubled dye laser (20 pulses/second, 2mJ/pulse, 10 minutes exposure) resulted, respectively, in the following normalized index changes $\Delta(\Delta = \Delta n/n):9.7 \times 10^{-5}$, $7 \times 10^{-4}$, and $1.8 \times 10^{-3}$. Increasing the exposure to the actinic radiation would not have substantially further increased $\Delta$.

Another commercially available optical fiber (having about 8 mole % $GeO_2$ in the core), was maintained at 50° C. in 95 atmospheres of $H_2$ for 3 days, resulting in about $8.04 \times 10^3$ ppm $H_2$ in the fiber core. Exposure (1.5 mJ/pulse, 50 pulses/second, 8 minutes) to the above described UV radiation resulted in $\Delta = 1.6 \times 10^{-3}$.

Figure 1:
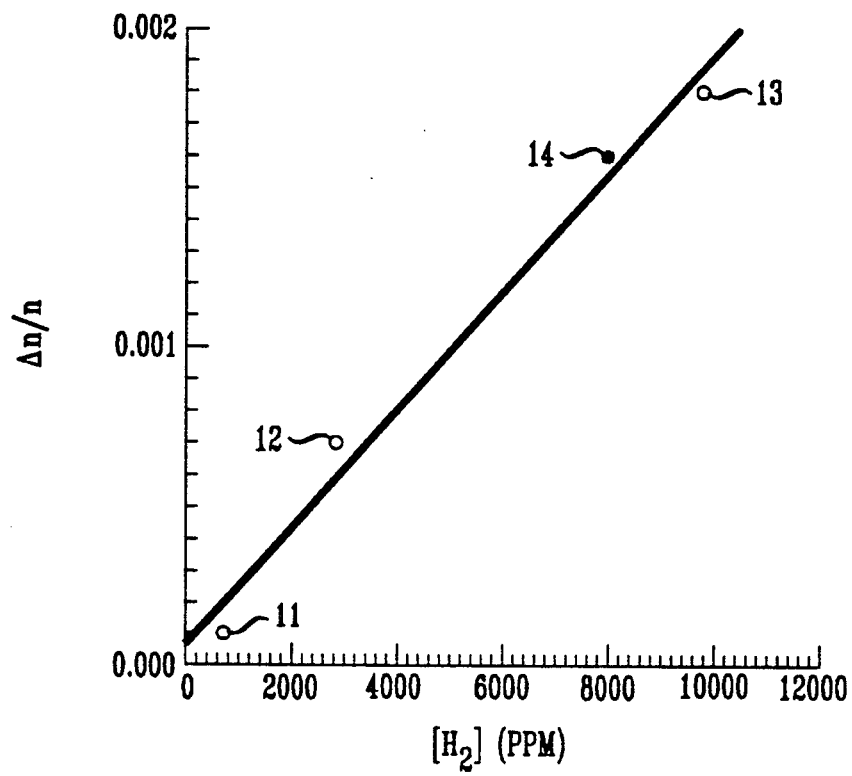
FIG. 1 presents exemplary data on UV-induced refractive index change as a function of $H_2$ concentration in the glass.

These exemplary results are shown in FIG. 1, wherein points 11, 12 and 13 pertain to the lightly Ge-doped (5D) fiber, and 14 pertains to the moderately Ge-doped fiber. As FIG. 1 illustrates, there appears to exist a substantially linear relationship between $H_2$ content in the fiber and the attainable value of index change, at least for some range of Ge-doping.

Although some useful index change may be obtainable also for very low levels of Ge-doping (e.g., <0.5 mole % of $GeO_2$), the invention preferably is embodied in waveguides comprising at least 0.5 mole % $GeO_2$ or other appropriate dopant. Pure $SiO_2$ does not exhibit any significant index change, substantially independent of the $H_2$ concentration in the fiber (at least up to about 8,400 ppm $H_2$). However, practice of the invention is not restricted to germanosilicate glass.

Other exemplary results are as follows: maintaining an optical fiber at 200° C. for 40 minutes in 150 atmospheres of $H_2$ results in about $4.56 \times 10^3$ ppm of $H_2$ in the core. And maintaining a planar structure consisting of a 25 $\mu$m thick layer of $SiO_2$, with an underlying germanosilicate glass layer (8 $\mu$m thick, 2.6 mole % $GeO_2$) at 21° C. for 6 days in 187 atmospheres $H_2$, or at 75° C. for 11 hours at 325 atmospheres $H_2$, is estimated to result in sufficient $H_2$ loading to yield $\Delta \sim 4 \times 10^{-3}$.

We currently believe that the prior art (high temperature) hydrogen treatment involves a different physical mechanism than does the inventive (low temperature) treatment. In particular, we currently believe that the former involves substantial dissociation of $H_2$ into atomic hydrogen during the high temperature treatment, and reaction of the atomic hydrogen with the glass, whereas the latter involves "loading" the glass with molecular hydrogen, with dissociation into atomic hydrogen (and association with some appropriate defect such that a stable entity results) occurring during UV irradiation. Similarly, the experimental facts disclosed by McStay (op. cit.) clearly show that the weak photosensitivity observed by him is due to a different mechanism than the large photorefractive effect that can result from a treatment according to the invention.

The above remarks are offered for pedagogical reasons only, and our invention does not depend on the correctness of our present theoretical understanding.

It will be appreciated that, after completion of loading the glass with $H_2$, some of the hydrogen will generally again diffuse out of the glass, at a rate that depends inter alia on temperature. However, the rate typically is slow enough such that there is ample time (typically many hours) to irradiate the glass with UV radiation. Exemplarily, irradiation should take place within about one week from the completion of the hydrogen loading. Those skilled in the art will recognize that cold storage of the fiber will retard out-diffusion, making longer delays possible.

Loss of $H_2$ from the unirradiated portions of the glass has the desirable consequence that the inventive method results in relatively little increase of the optical loss in the waveguide, and in substantially no non-localized change in refractive index.

The question of reliability of index gratings in fiber is of concern to those involved in the development of such gratings. By this we mean that there is concern in the field whether or not the properties (e.g., optical strength) of such gratings will change with time, especially if a grating is exposed to elevated temperatures.

Figure 2:
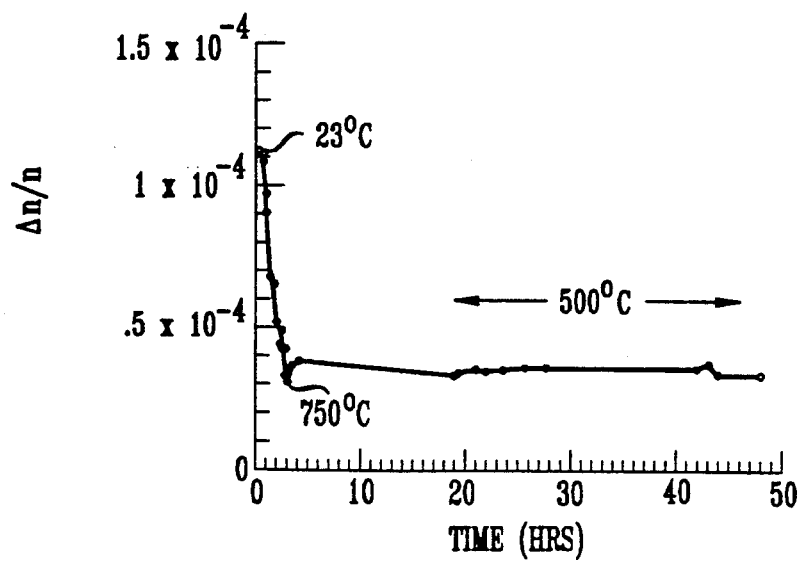
FIG. 2 shows exemplary data on refractive index as a function of time during the course of a particular heat treatment of an optical fiber.

The inventive method can result in highly stable refractive index change, as is exemplarily illustrated by FIG. 2, which shows the normalized refractive index change $\Delta$ as a function of time, for an exemplary commercially available (5 D) fiber that had previously been loaded with $H_2$ and exposed to UV radiation such that a refractive index grating (index spacing about 0.5 $\mu$m) was formed in the fiber. The fiber contained about $9.3 \times 10^3$ ppm $H_2$ but the UV exposure was limited such that a grating of moderate strength ($\Delta \sim 1.1 \times 10^{-4}$) resulted. After the grating was fully formed the fiber was heated to 750° C. at 250° C./hour, followed by cooling to room temperature. As can be seen from FIG. 2, after reaching 750° C. the normalized index change had decreased to about $3 \times 10^{-5}$. About 19 hours after the start of the temperature treatment the fiber was heated to 500° C. and maintained at that temperature for about 29 hours. As can be seen from FIG. 2, the refractive index remained essentially constant during this time, indicating that the previous annealing had eliminated relatively unstable species, with the remaining species being stable even at the very high temperature of 500° C.

The inventive method optionally comprises a preanneal that results in substantial elimination of relatively unstable species, whereby the reliability of the index change in the fiber can be improved. Generally, the pre-anneal involves heating of the waveguide (or of a relevant portion thereof, e.g., substantially only the waveguide core) to a temperature above any anticipated operating temperature of the waveguide. This heating can take place during exposure to actinic radiation, or subsequent thereto. It can also take place subsequent to a first and prior to a second exposure. A preferred method of heating substantially only the waveguide core comprises coupling into the waveguide radiation of a wavelength at which the UV irradiated portion of the waveguide absorbs, e.g., at about 1.4 μm. It will be appreciated that by "heating" in this context we mean heating for a period of time (exemplarily at least a minute) that is effective for removing at least a major portion of the defects that are not stable at the anneal temperature. The term does not include any transitory heating that may be associated with the incidence of an individual pulse of the actinic radiation.

As those skilled in the art will recognize, pre-annealing results in a (typically temperature-dependent) decrease in $\Delta$, requiring that the initial $\Delta$ be larger than the desired. It is a simple matter to determine, for a predetermined anneal temperature, the fractional decrease in $\Delta$, and therefore it is a simple matter to determine the appropriate initial $\Delta$, or equivalently, the appropriate $H_2$ loading conditions. In many cases waveguide operating temperatures will not exceed 75° C., and anneal temperatures will frequently be in the range 200°–400° C., (but always higher than the anticipated maximum operating temperature, frequently at least 100° C. higher).

Figure 3:
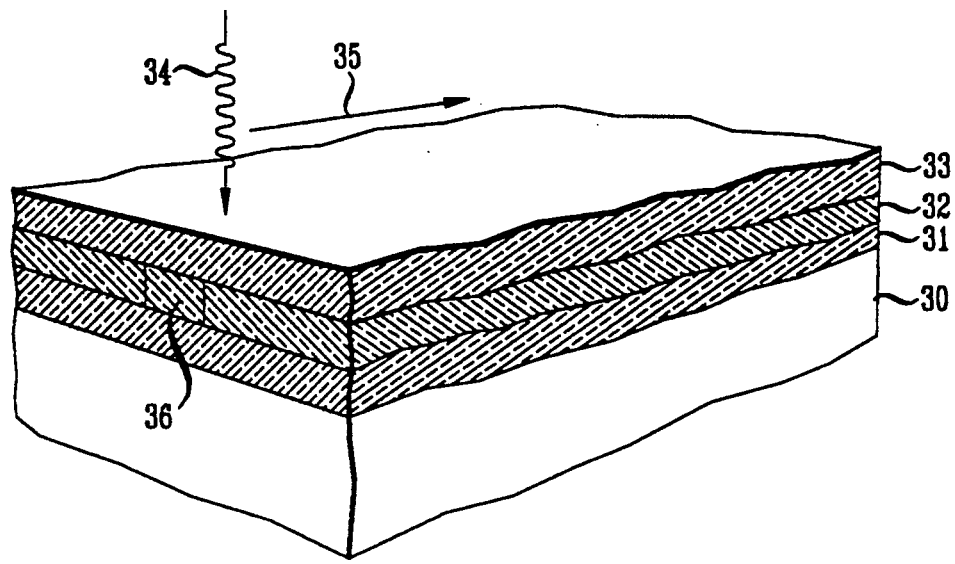
FIG. 3 schematically depicts a novel planar optical waveguide.

As those skilled in the art may appreciate, the inventive method can be used to modify the refractive index not only of optical fiber but also of planar waveguides. Furthermore, the method's ability to readily yield large refractive index changes (e.g., $\Delta n > 10^{-4}$) makes possible a novel method of forming planar optical waveguides, as schematically depicted in FIG. 3. On substrate 30 (e.g., a Si wafer) is formed lower cladding layer 31 (vitreous silica), doped silica (e.g., germanosilicate) layer 32, and upper cladding layer 33 (vitreous silica). This structure has waveguiding properties normal to the layers, but does not confine the radiation in the plane. Confinement is achieved by loading the structure with $H_2$, substantially as described above, irradiating the structure with focused UV radiation 34, and moving the beam over the structure in a predetermined manner (indicated by arrow 35). (Alternatively, a mask can be used to expose preselected portions). The refractive index in core region 36 is raised, providing lateral guiding. On the other hand, the index of layers 31 and 33 remains essentially unchanged. As will be evident to those skilled in the art, the described novel technique for forming planar waveguides has many advantageous features. For instance, it can be used to readily make any desired waveguide configuration without need for $SiO_2$ etching, retaining surface planarity. Importantly, waveguides according to the invention are embedded in structurally homogeneous material and thus are likely to have relatively low scattering loss.

Figure 4:
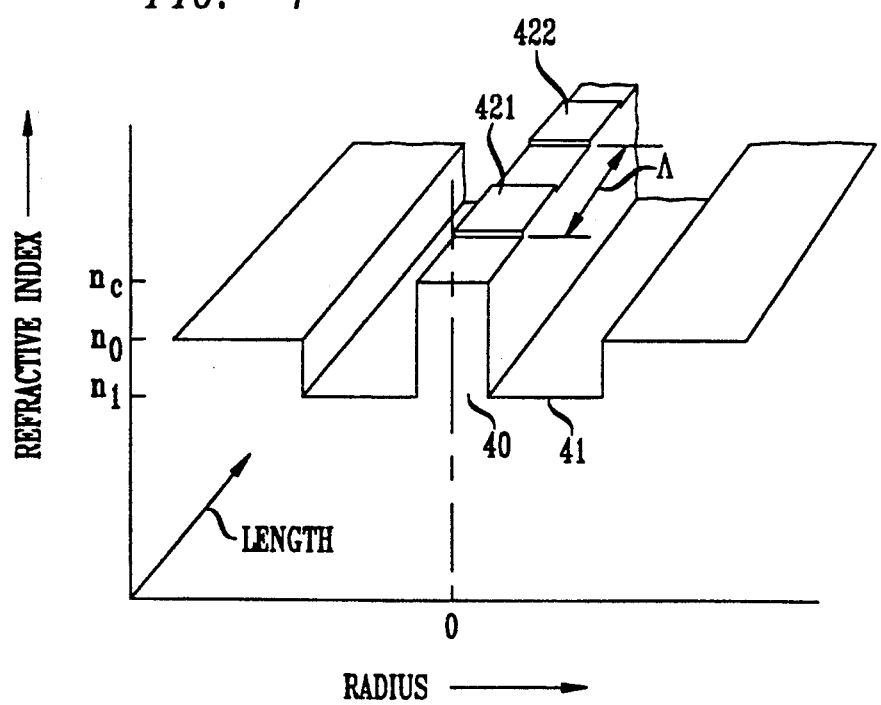
FIG. 4 shows schematically the refractive index vs. radius of an exemplary optical fiber with an in-line index grating.

The inventive method can be embodied in a variety of articles, including optical fiber communications systems and fiber or planar optical amplifiers. It can also be embodied in optical fiber that has a novel combination of properties, namely a relatively lightly doped core (typically less than 4.5 mole % $GeO_2$ per mole of $SiO_2$) and relatively large localized index variations (typically $\Delta$ at least $10^{-4}$). The refractive index of such a fiber is schematically depicted in FIG. 4, wherein $n_o$ refers to the refractive index of pure vitreous silica, $n_c$ and $n_1$ to the refractive indices of core 40 and cladding 41 respectively. The normalized core/cladding index difference $\Delta = (n_c - n_1)/n_c$, and 421, 422, ... refer to the localized regions of increased refractive index. Exemplarily, the localized variations are periodic, forming a strong in-line grating whose repeat distance $\Lambda$ is about 0.5 μm, but in any case is less than about 100 μm. It will of course be understood that the refractive index profile in actual optical fiber is not as regular as the schematic profile of FIG. 4, and that actual profiles do not have such sharp transitions between the various regions. However, actual profiles are frequently described in terms of conventional equivalent step index profile (having effective indices and effective radii). Thus, FIG. 4 is meant to show the equivalent step index profile, and $n_c$ and $n_1$ are intended to be effective refractive indices. It will also be understood that the above discussion refers only to fiber that has axially uniform cross section (ie., excluding fiber that has been treated to comprise a periodic change of the cross section), and furthermore refers only to fiber wherein the cladding refractive index is substantially unchanged.

We claim:
1. Method of making an article that comprises an optical waveguide, associated with the waveguide being a core, a cladding, a core refractive index and a cladding refractive index, the method comprising
   a) providing a waveguide that comprises high-silica glass,
   b) exposing at least a portion of the waveguide to $H_2$; and
   c) irradiating at least a part of the exposed portion of the waveguide with actinic radiation such that the refractive index of the irradiated portion is changed; characterized in that
   d) step b) comprises exposing the waveguide at a temperature of at most 250° C. to a $H_2$-containing atmosphere having a $H_2$ partial pressure greater than 1 atmosphere, such that irradiation can result in a normalized index change ($\Delta$) of at least $10^{-5}$.

2. Method according to claim 1, wherein the temperature is at most 150° C., the $H_2$-containing atmosphere is essentially a $H_2$ atmosphere of pressure greater than 10 atmospheres, and $\Delta$ is at least $5 \times 10^{-5}$.

3. Method according to claim 1, wherein the optical waveguide is an optical fiber.

4. Method according to claim 1, wherein the optical waveguide is a planar optical waveguide.

5. Method according to claim 1, wherein the refractive index of the irradiated portion is increased by at least $10^{-4}$.

6. Method according to claim 5, wherein step c) is carried out such that a refractive index grating is formed in the waveguide.

7. Method according to claim 1, wherein the waveguide comprises a core and a cladding, with the core comprising at least 0.5 mole % $GeO_2$.

8. Method according to claim 1, wherein associated with the waveguide is a maximum operating temperature, and wherein the method comprises heating, during and/or subsequent to step c), at least the core in said part of the exposed portion of the waveguide to a temperature that is greater than the maximum operating temperature.

9. Method according to claim 8, wherein the core comprises at least 0.5 mole % $GeO_2$, and said temperature is at least 100° C. greater than the maximum operating temperature.

10. Method of claim 8, wherein the core is heated by means of radiation coupled into the waveguide.

11. Method of claim 8, further comprising an irradiating step subsequent to said heating step.

12. Method according to claim 1, wherein the article is an optical communication system, the waveguide is an optical fiber, and step c) is carried out such that a refractive index grating is formed in the waveguide, the grating having a repeat distance of about 0.5 µm.

13. An article that comprises high-silica optical fiber having an axially uniform cross section, a core and a cladding surrounding the core, the core comprising less than 4.5 mole % $GeO_2$, associated with the core and the cladding being a core refractive index and a cladding refractive index, respectively, wherein in a portion of the fiber the core refractive index varies periodically, with a repeat distance less than 100 µm, with the normalized core index variation being at least $10^{-4}$, and with the cladding refractive index being substantially axially constant.

14. An article according to claim 13, wherein the article is an optical communication system that comprises a fiber optical amplifier, said periodic index variation being associated with the optical amplifier.

* * * * *